(12) United States Patent
Pradas et al.

(10) Patent No.: US 11,552,745 B2
(45) Date of Patent: *Jan. 10, 2023

(54) SYSTEMS AND METHODS FOR REMOVAL OF DUPLICATED PACKETS FOR TRANSMISSION

(71) Applicant: Telefonaktiebolaget LM Ericsson (publ), Stockholm (SE)

(72) Inventors: Jose Luis Pradas, Stockholm (SE); Torsten Dudda, Aachen (DE); Caner Kilinc, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,802

(22) Filed: May 7, 2021

(65) Prior Publication Data

US 2021/0266115 A1 Aug. 26, 2021

Related U.S. Application Data

(63) Continuation of application No. 15/754,072, filed as application No. PCT/PP2017/082577 on Dec. 13, 2017, now Pat. No. 1,105,606.

(Continued)

(51) Int. Cl.
*H04L 1/18* (2006.01)
*H04L 1/00* (2006.01)
(Continued)

(52) U.S. Cl.
CPC ............ *H04L 1/1874* (2013.01); *H04L 1/188* (2013.01); *H04L 1/1887* (2013.01); *H04L 1/187* (2013.01);
(Continued)

(58) Field of Classification Search
CPC ...... H04L 1/1874; H04L 1/188; H04L 1/1887; H04L 1/187; H04L 2001/0096; H04W 80/02; H04W 92/20
See application file for complete search history.

(56) References Cited

U.S. PATENT DOCUMENTS 9,425,925 B2 * 8/2016 Lee .................. H04L 1/1861
11,005,606 B2 * 5/2021 Pradas ............... H04L 1/1874
(Continued)

FOREIGN PATENT DOCUMENTS

KR          100965007 B1    6/2010
KR       2016 0033072 A    3/2016
(Continued)

OTHER PUBLICATIONS

3GPP TSG-RAN WG2 #97; Athens, Greece; Source: Ericsson; Title: Further aspects of data duplication in PDCP layer (Tdoc R2-1700834)—Feb. 13-17, 2017 (Year: 2017).*

(Continued)

*Primary Examiner* — Afshawn M Towfighi
(74) *Attorney, Agent, or Firm* — Baker Botts, LLP

(57) ABSTRACT

According to certain embodiments, a method in a wireless device (110) includes transmitting a protocol data unit (PDU) or segment of a PDU on a first link and transmitting the PDU or the segment of the PDU on a second link. One or more retransmissions of the PDU or the segment of the PDU are scheduled on the second link. A positive acknowledgment is received from a receiver. The positive acknowledgement indicates a successful receipt of the PDU or the segment of the PDU on the first link. In response to receiving the positive acknowledgement, the one or more retransmissions of the PDU or the segment of the PDU on the second link are cancelled.

18 Claims, 11 Drawing Sheets

Related U.S. Application Data

(60) Provisional application No. 62/476,505, filed on Mar. 24, 2017.

(51) Int. Cl.
  *H04W 80/02* (2009.01)
  *H04W 92/20* (2009.01)

(52) U.S. Cl.
  CPC ..... *H04L 2001/0096* (2013.01); *H04W 80/02* (2013.01); *H04W 92/20* (2013.01)

(56) References Cited

U.S. PATENT DOCUMENTS

| | | | |
|---|---|---|---|
| 2010/0118780 A1* | 5/2010 | Umesh | H04L 69/03 370/328 |
| 2013/0023302 A1* | 1/2013 | Sivanesan | H04W 36/32 455/525 |
| 2015/0043435 A1 | 2/2015 | Blankenship et al. | |
| 2016/0164793 A1 | 6/2016 | Basu Mallick et al. | |
| 2016/0183158 A1 | 6/2016 | Decarreau et al. | |
| 2017/0289021 A1* | 10/2017 | Saily | H04W 74/006 |

FOREIGN PATENT DOCUMENTS

| | | |
|---|---|---|
| RU | 2 486 700 C2 | 6/2013 |
| RU | 2 504 118 C2 | 1/2014 |
| WO | 2009 076348 A1 | 6/2009 |
| WO | 2012 064772 A1 | 5/2012 |
| WO | WO 2012/064772 * | 5/2012 |
| WO | 2013 122163 A1 | 8/2013 |
| WO | 2015 008962 A1 | 1/2015 |
| WO | 2016 028563 A1 | 2/2016 |
| WO | 2018 171922 A1 | 9/2018 |

OTHER PUBLICATIONS

PCT Notification of Transmittal of the International Preliminary Report on Patentability for International application No. PCT/EP2017/082577—dated Jun. 6, 2019.
Russian Office Action and Search Report issued for Application No. 2019133668/07—dated Apr. 15, 2020.
3GPP TSG-RAN WG2 #97; Athens, Greece; Source: Ericsson; Title: Further aspects of data duplication in PDCP layer (Tdoc R2-1700834)—Feb. 13-17, 2017.
PCT Notification of Transmittal of the International Search Report and the Written Opinion of the International Searching Authority, or the Declaration for International application No. PCT/EP2017/082577—dated Mar. 26, 2018.
Japanese Office Action issued for Patent Application No. 2019-552544—dated Nov. 9, 2020.
Chinese Office Action issued for Application No. 201780088910.1—dated Jul. 9, 2021.
Korean Patent Allowance issued for Korean Patent Application No. 2019-7026648—dated Feb. 1, 2021.
3GPP TSG-RAN NR Ad Hoc, Spokane, Washington, US; Source: Huawei, HiSilicon; Title: Evaluation on packet duplication in multi-connectivity (R2-1700172)—Jan. 17-19, 2017.
3GPP TSG-RAN WG2 #97; Athens, Greece; Source: Ericsson; Title: Data duplication in lower layers (HARQ) (Tdoc R2-1702032, Revision of R2-1700833)—Feb. 13-17, 2017.

* cited by examiner

SYSTEMS AND METHODS FOR REMOVAL OF DUPLICATED PACKETS FOR TRANSMISSION

PRIORITY

This application is a continuation, under 35 U.S.C. § 120 of U.S. patent application Ser. No. 15/754,072 filed on Feb. 21, 2018 which is a U.S. National Stage Filing under 35 U.S.C. § 371 of International Patent Application Serial No. PCT/EP2017/082577 filed Dec. 13, 2017, and entitled "Systems And Methods For Removal Of Duplicated Packets For Transmission" which claims priority to U.S. Provisional Patent Application No. 62/476,505 filed Mar. 24, 2017, both of which are hereby incorporated by reference in their entirety.

TECHNICAL FIELD

The present disclosure relates, in general, to wireless communications and, more particularly, methods and systems for removal of duplicated packets for transmission.

BACKGROUND

In NR, Dual Connectivity (DC) in downlink (DL) and uplink (UL) are two of the features which will be standardized. These features are also available in Long Term Evolution (LTE). In NR, the Packet Data Convergence Protocol (PDCP) data duplication will also be standardized. This means that the same PDCP protocol data unit (PDU) may be transmitted on two different legs/paths. This type of feature may be useful in scenarios when reliability is important such as ultra-reliable low latency communication (URLLC) or limited-coverage situations.

FIG. 1 illustrates the DC architecture between LTE and NR. When data duplication is enabled, the same PDCP PDU is transmitted by each radio access technology (RAT). When the radio link control (RLC) entity requests data from PDCP, the PDCP layer delivers the PDCP PDU to the requesting RLC entity.

When RLC Acknowledge Mode (AM) is configured, each RLC entity will perform retransmissions until the data has been successfully acknowledged or the maximum number of RLC retransmissions has been reached. In the latter case, the UE triggers the Radio Link Failure (RLF) procedure. In limited-coverage situations, the maximum number of RLC retransmissions may be reached.

When packet duplication is enabled, there may be cases when a PDCP PDU is received via one of the legs while the same (duplicated) PDCP PDU has not or has not yet been received by the other leg due to link problems. The RLC entity of the link with problems may be performing RLC retransmissions of the RLC PDU(s) containing the PDCP PDU. If the RLC entity reaches the maximum number of retransmissions, the UE will trigger a RLF procedure though such a procedure is not really necessary. Further, triggering a RLF procedure may not be desirable when there is, at least, one link which is performing and in which data is transmitted/received correctly.

SUMMARY

To address the foregoing problems with existing solutions, disclosed is methods and systems for removal of duplicated packets for transmission. Specifically, a mechanism is provided for removing radio link control (RLC) protocol data units (PDUs), which contained a certain Packet Data Convergence Protocol (PDCP) PDU, from the RLC buffer when the RLC PDU(s) are being transmitted or retransmitted to a receiver by one link though the PDCP PDU was received by the receiver via a second link.

In certain embodiments, the systems and methods may be implemented in or by a wireless device, which may include a user equipment (UE), and/or a network node, which may include a eNodeB (eNB).

According to certain embodiments, a method in a wireless device may include transmitting a PDU or segment of a PDU on a first link and transmitting the PDU or the segment of the PDU on a second link. One or more retransmissions of the PDU or the segment of the PDU are scheduled on the second link. A positive acknowledgment is received from a receiver. The positive acknowledgement indicates a successful receipt of the PDU or the segment of the PDU on the first link. In response to receiving the positive acknowledgement, the one or more retransmissions of the PDU or the segment of the PDU on the second link are cancelled.

According to certain embodiments, a wireless device may include processing circuitry configured to transmit a PDU or a segment of a PDU on a first link and transmit the PDU or the segment of the PDU on a second link. One or more retransmissions of the PDU or the segment of the PDU are scheduled on the second link. A positive acknowledgment is received from a receiver. The positive acknowledgement indicates a successful receipt of the PDU or the segment of the PDU on the first link. In response to receiving the positive acknowledgement, the one or more retransmissions of the PDU or the segment of the PDU on the second link are cancelled.

Certain embodiments of the present disclosure may provide one or more technical advantages. For example, certain embodiments may avoid the unnecessary triggering of a Radio Link Failure (RLF) procedure in response to a maximum number of RLC transmissions when data is duplicated and transmitted via two different links and a successful transmission is received via one of the two links. Accordingly, certain embodiments save network resources. Additionally, certain embodiments avoid RLC reestablishments.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide methods and systems for controlling gap sharing between intra-frequency measurements of different types. Particular embodiments are described in FIGS. 2-15 of the drawings, like numerals being used for like and corresponding parts of the various drawings.

Figure 1:
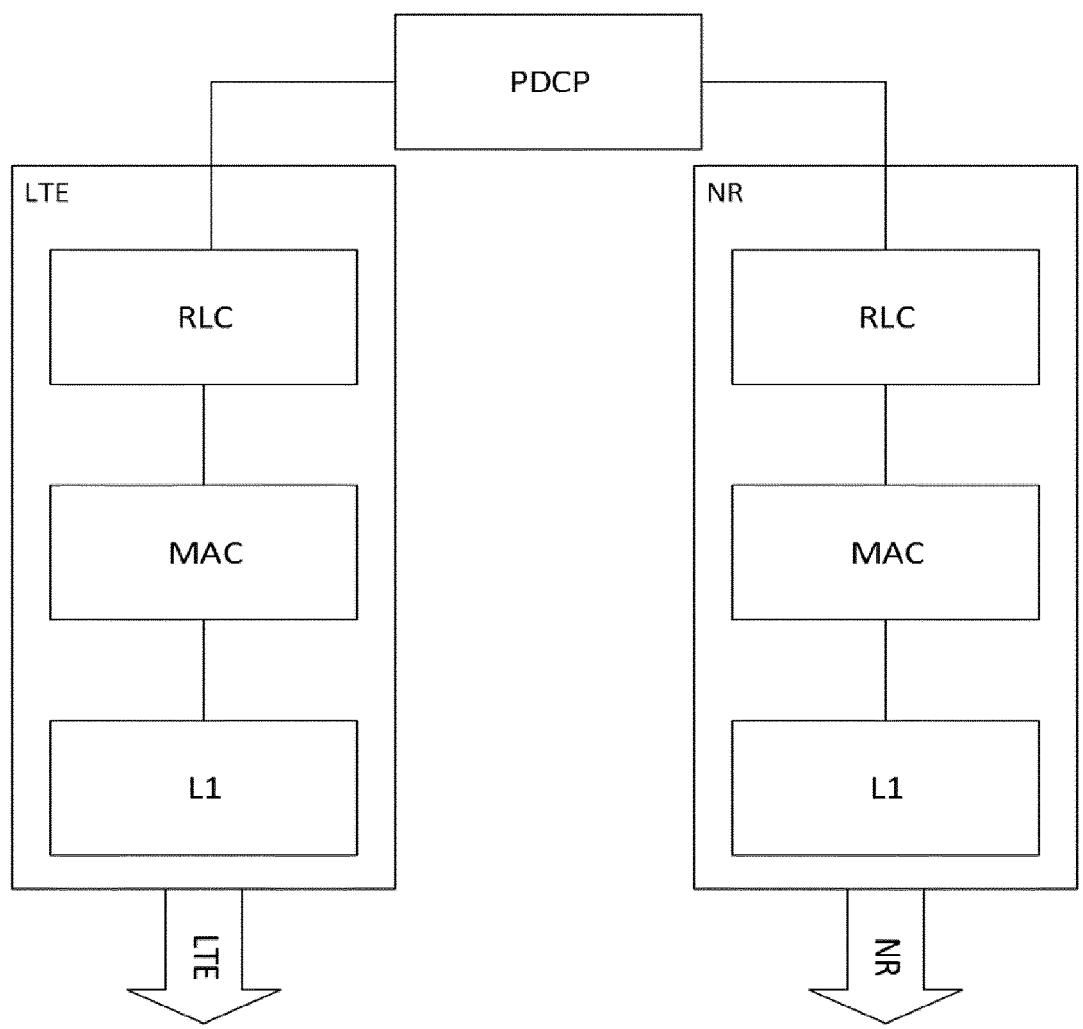
FIG. 1 illustrates the DC architecture between LTE and NR.
Figure 2:
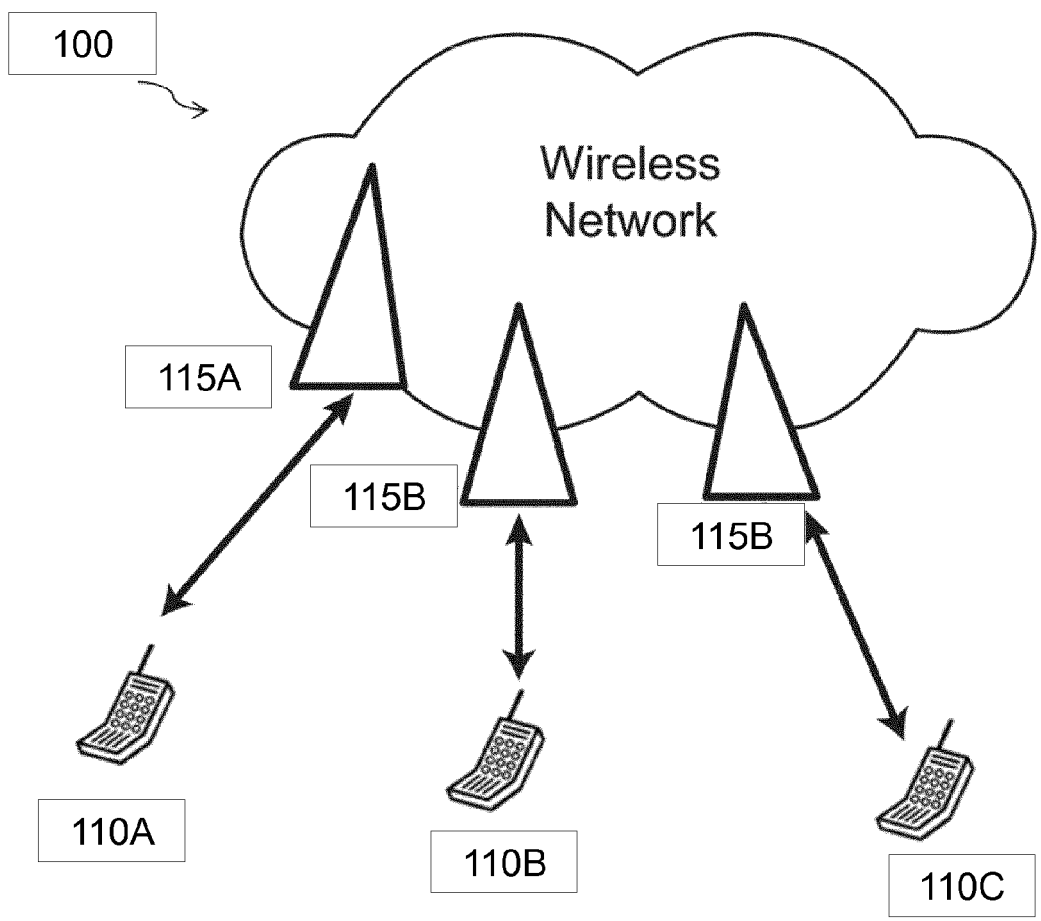
FIG. 2 illustrates an example wireless network for removal of duplicated packets for transmission, according to certain embodiments.

FIG. 2 illustrates a wireless network 100 for removal of duplicated packets for transmission, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 2). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an intermode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a target device, a device-to-device (D2D) capable device, a machine type communication (MTC) device or other UE capable of machine-to-machine (M2M) communication, a mobile phone or other terminal, a smart phone, a PDA (Personal Digital Assistant), a portable computer (e.g., laptop, tablet), a sensor, a modem, laptop embedded equipment (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, MeNB, SeNB, a network node belonging to MCG or SCG, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, test equipment, or any suitable network node. Example embodiments of wireless devices 110, network nodes 115, and other network nodes (such as radio network controller or core network node) are described in more detail with respect to FIGS. 3, 4, and 15, respectively.

Although FIG. 2 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any LTE based systems such as MTC, eMTC, and NB-IoT. As an example, MTC UE, eMTC UE, and NB-IoT UE may also be called UE category 0, UE category M1 and UE category NB1, respectively. However, the embodiments are applicable to any radio access technology (RAT) or multi-RAT systems in which the wireless device receives and/or transmits signals (e.g., data). For example, the various embodiments described herein may also be applicable to, LTE-Advanced, and LTE-U UMTS, LTE FDD/TDD, WCDMA/HSPA, GSM/GERAN, WiFi, WLAN, cdma2000, WiMax, 5G, New Radio (NR), another suitable radio access technology, or any suitable combination of one or more radio access technologies. It is noted that 5G, the fifth generation of mobile telecommunications and wireless technology is not yet fully defined but in an advanced draft stage with 3GPP. It includes work on 5G New Radio (NR) Access Technology. LTE terminology is used herein in a forward looking sense, to include equivalent 5G entities or functionalities although a different term may be specified in 5G. A general description of the agreements on 5G NR Access Technology is contained in most recent versions of the 3GPP 38-series Technical Reports. Although certain embodiments may be described in the context of wireless transmissions in the downlink, the present disclosure contemplates that the various embodiments are equally applicable in the uplink and vice versa. The described techniques are generally applicable for transmissions from both network nodes 115 and wireless devices 110.

Figure 3:
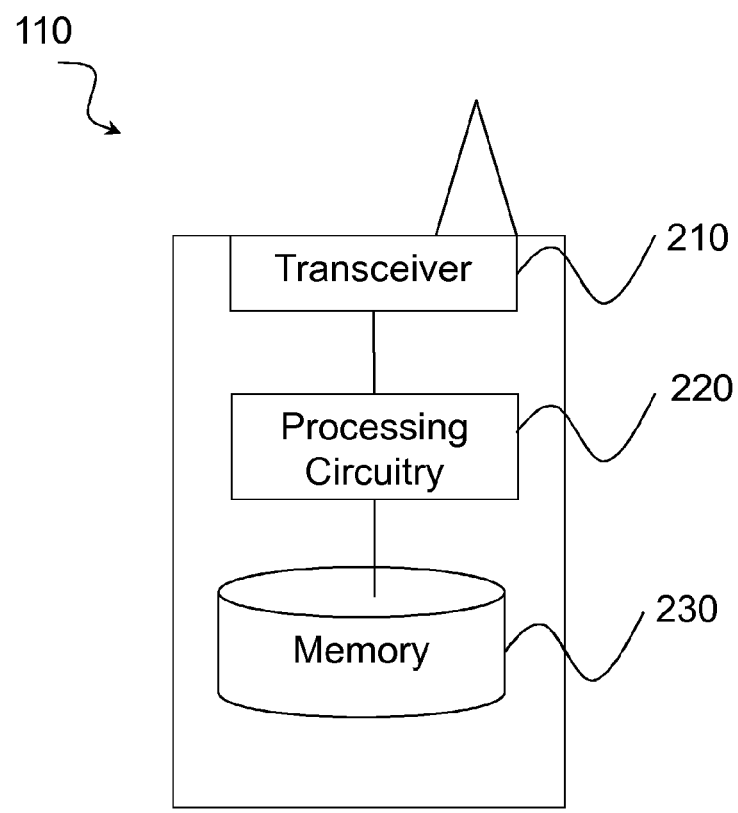
FIG. 3 illustrates an example wireless device for removal of duplicated packets for transmission, according to certain embodiments.

FIG. 3 illustrates an example wireless device 110 for controlling gap sharing between intra-frequency measurements of different types, in accordance with certain embodiments. As depicted, wireless device 210 includes transceiver 210, processing circuitry 220, and memory 230. In some embodiments, transceiver 210 facilitates transmitting wireless signals to and receiving wireless signals from network node 115 (e.g., via an antenna), processing circuitry 220 executes instructions to provide some or all of the functionality described above as being provided by wireless device 110, and memory 230 stores the instructions executed by processing circuitry 220. Examples of a wireless device 110 are provided above.

Processing circuitry 220 may include any suitable combination of hardware and software implemented in one or more modules to execute instructions and manipulate data to perform some or all of the described functions of wireless device 110. In some embodiments, processing circuitry 220 may include, for example, one or more computers, one or more central processing units (CPUs), one or more processors, one or more microprocessors, one or more applications, and/or other logic.

Memory 230 is generally operable to store instructions, such as a computer program, software, an application including one or more of logic, rules, algorithms, code, tables, etc. and/or other instructions capable of being executed by processing circuitry. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

Figure 4:
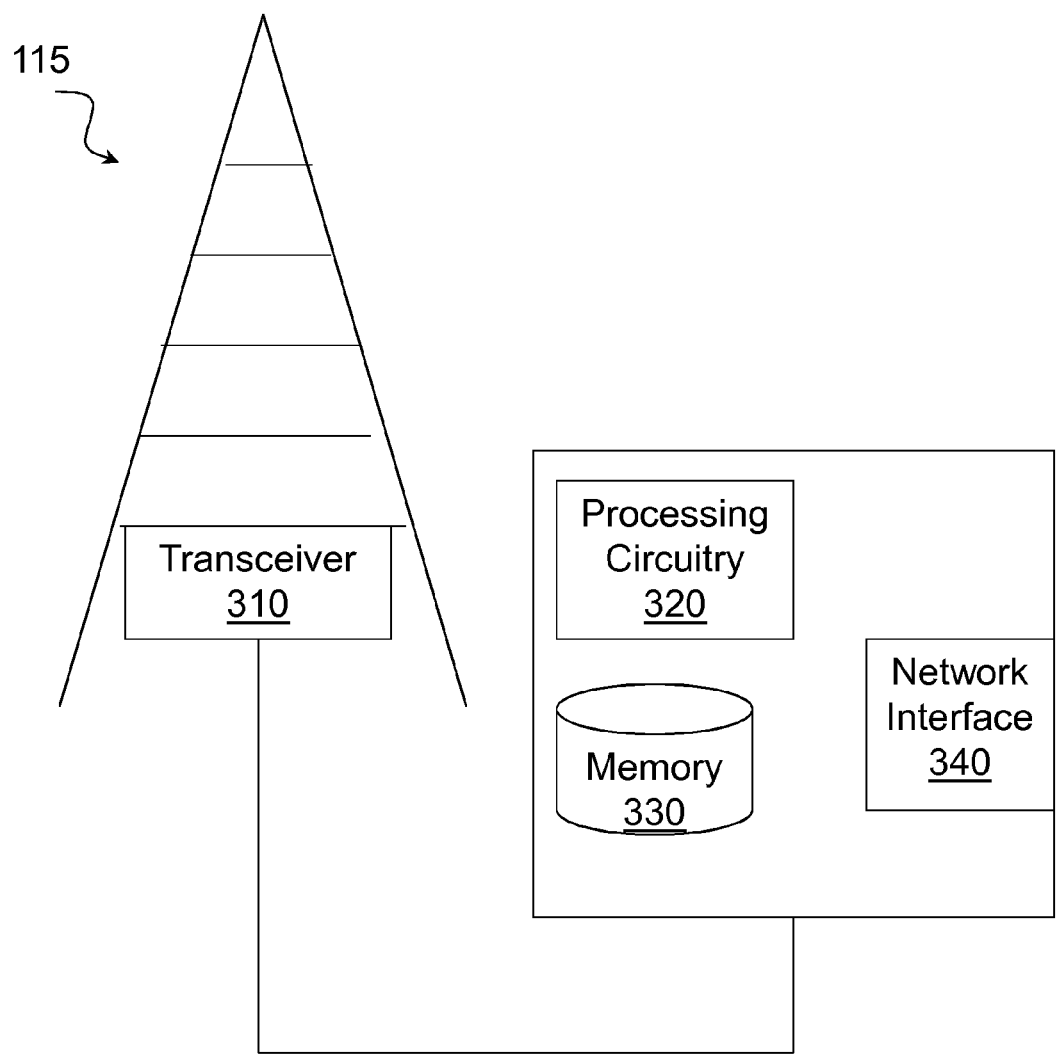
FIG. 4 illustrate an example network node for removal of duplicated packets for transmission, according to certain embodiments.

FIG. 4 illustrate an example network node 115 for controlling gap sharing between intra-frequency measurements of different types, according to certain embodiments.

As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320, memory 330, and network interface 340. In some embodiments, transceiver 310 facilitates transmitting wireless signals to and receiving wireless signals from wireless device 110 (e.g., via an antenna), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 320 may include any suitable combination of hardware and software implemented in one or more modules to execute instructions and manipulate data to perform some or all of the described functions of network node 115. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 5:
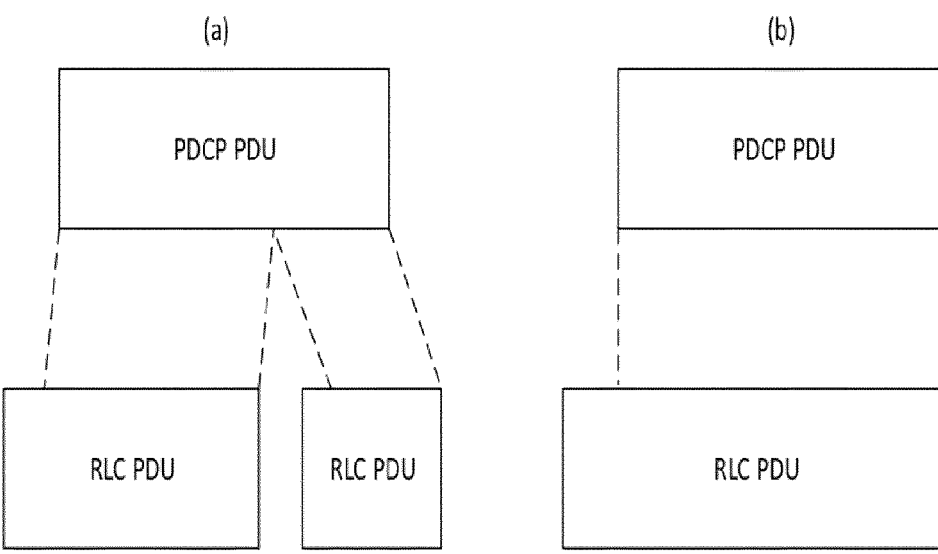
FIG. 5 illustrates example mapping of Packet Data Convergence Protocol (PDCP) Protocol Data Units (PDUs) to Radio Link Control (RLC) PDUs, according to certain embodiments.
Figure 6:
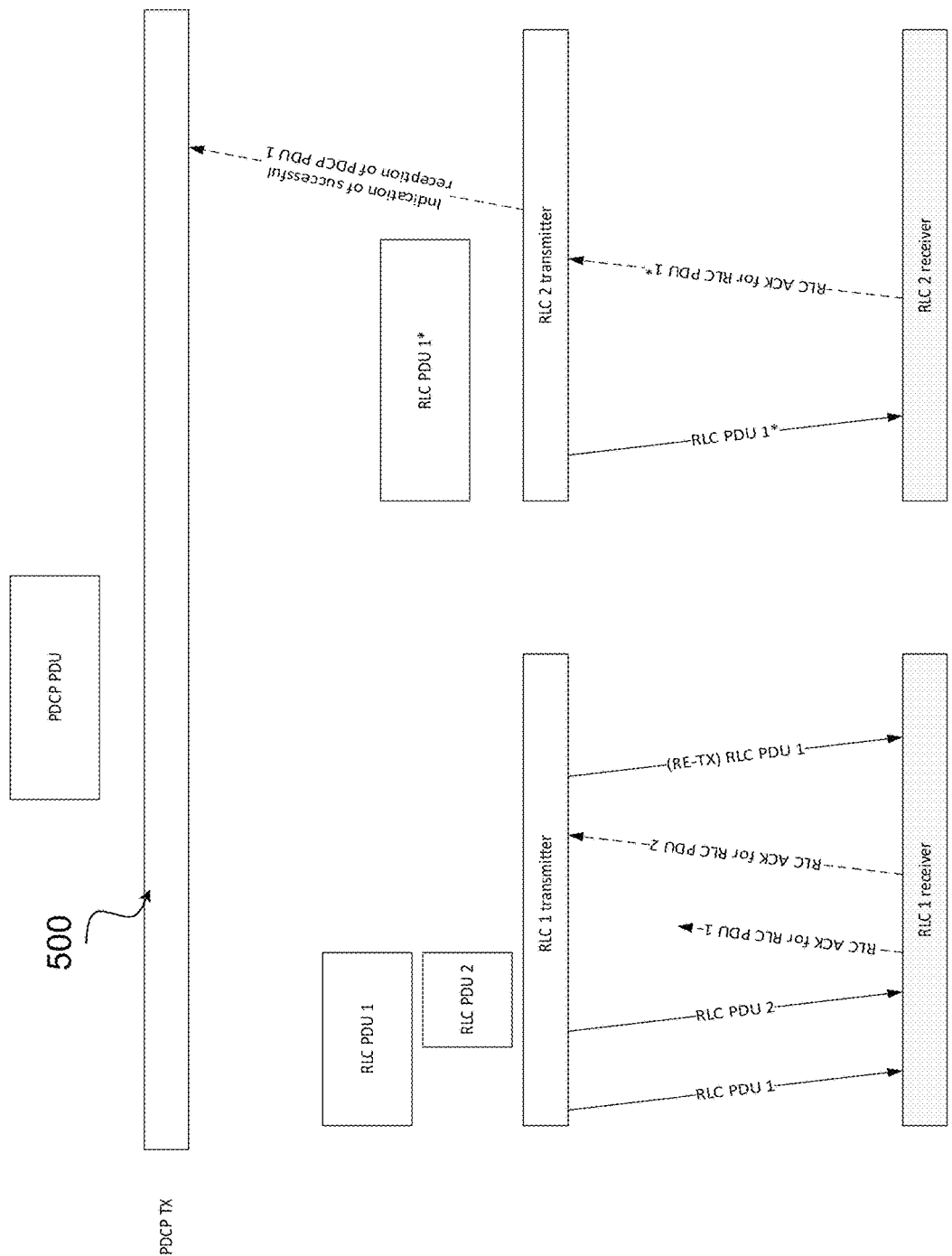
FIG. 6 illustrates an example PDCP PDU transmitted independently by two radio link control (RLC) entities, according to certain embodiments.

According to certain embodiments, wireless devices 110 and network node 115 may cooperate to result in the removal of duplicated packets for transmission. For example, wireless device 110 may be configured by network node 115 to remove duplicated packets from transmission when configured for Radio Link Control (RLC) Acknowledge Mode (AM)/Unacknowledge Mode (UM). According to certain embodiments, when Packet Data Convergence Protocol (PDCP) Protocol Data Units (PDUs) are transmitted via two links, the RLC entity of each of the links will transmit the PDCP PDU. Each RLC entity will transmit the PDCP PDU in one or more than one RLC PDU(s) or RLC PDU segments. FIG. 5 illustrates an example mapping 400 of PDCP PDUs to RLC PDUs. FIG. 6 illustrates a PDCP PDU 500 transmitted independently by two RLC entities, according to certain embodiments. Typically, the receiving entity may transmit a positive acknowledgment within a RLC status report for each RLC PDU that is successfully received. When all RLC PDUs (or PDU segments) carrying the different parts of the PDCP PDU have been acknowledged, the RLC entity will indicate to the PDCP entity that the PDCP packet was received by the peer entity.

Figure 7:
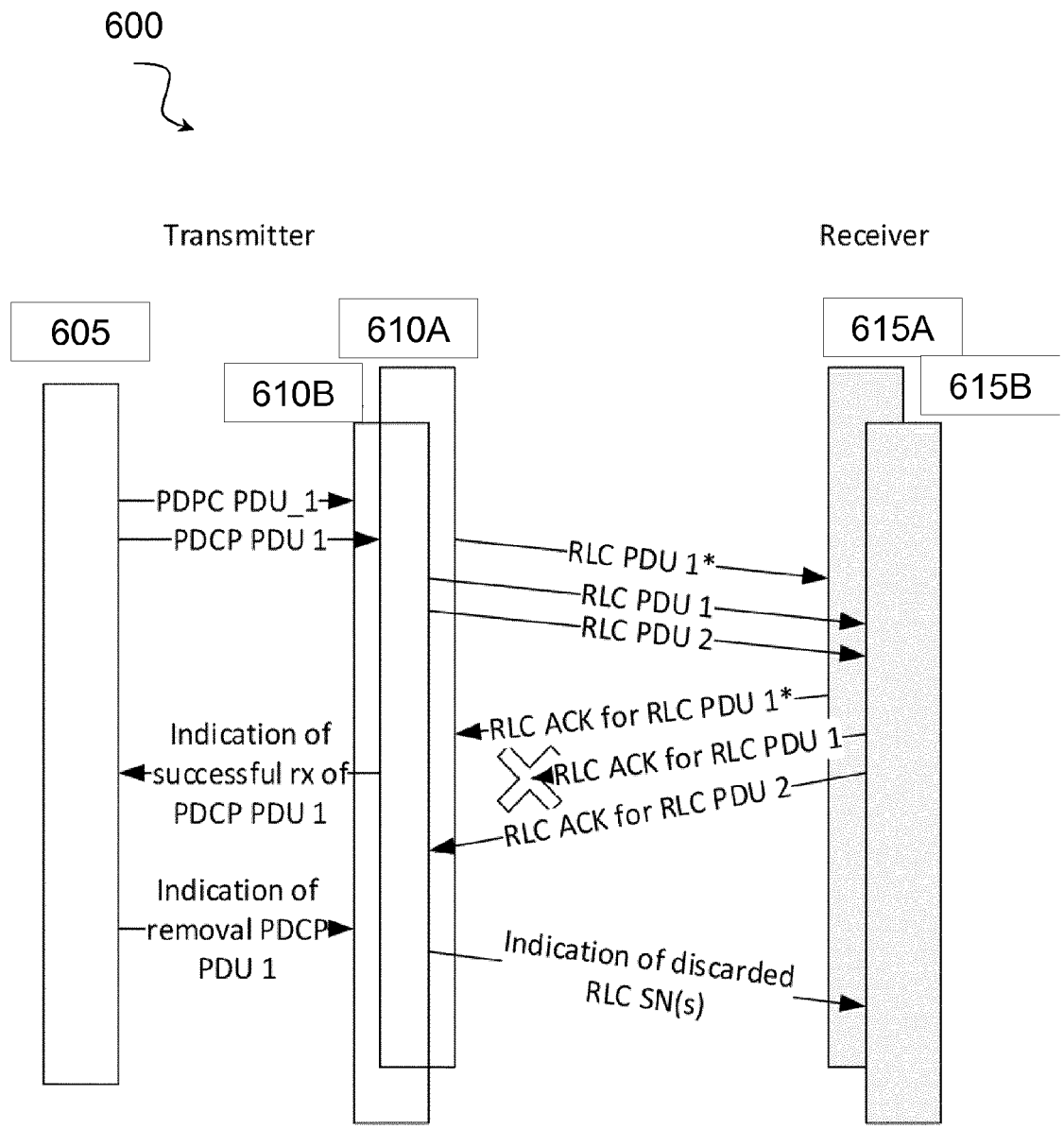
FIG. 7 illustrates an example transmission sequence chart for removal of duplicate packets for transmission, according to certain embodiments.

FIG. 7 illustrates an example transmission sequence 600 for removal of duplicate packets for transmission when duplicate PDCP PDUs are transmitted via two links. According to certain embodiments, when the PDCP entity 605 receives an indication by a first one of the RLC entities 610A that a certain PDCP PDU has been received by the peer entity:

1) The PDCP entity 605 indicates to the second RLC entity 610B to stop the transmission of the RLC PDU(s) containing the PDCP PDU.

According to certain embodiments, it may be assumed that the second RLC entity 610B had not yet indicated that the PDCP PDU was received by the peer entity. Thus the indication from PDCP 605 to this second RLC entity 610B may be optional, according to certain embodiments, and only transmitted if this second RLC entity 610B did not yet indicate successful transmission of the PDCP PDU.

Figure 8:
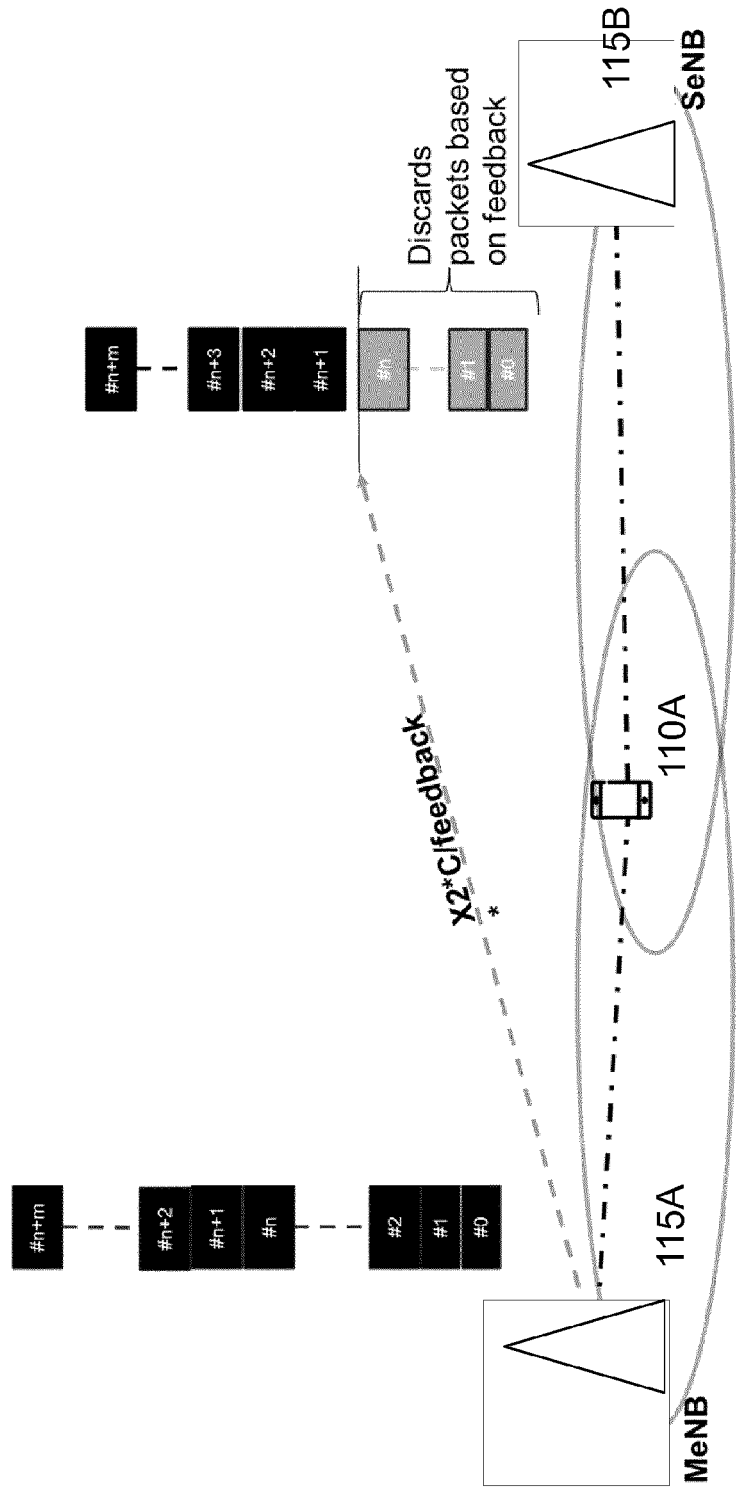
FIG. 8 illustrates an example wireless network for the discarding of packets based on feedback transmitted on the X2 channel, according to certain embodiments.

According to certain embodiments, the PDCP 605 and the second RLC entity 610B may not be co-located. In such an embodiment, communication of the indication to discard PDCP PDUs in the second RLC may 610B be communicated via a backhaul channel. For example, the indication may be communicated via the X2 (or evolution thereof). According to a particular embodiment, the indication may be included in flow control signaling from a node implementing PDCP to a node implementing RLC. FIG. 8 illustrates an example wireless network 700 for the discarding of packets based on feedback transmitted on the X2 channel.

2) The second RLC entity 610B should stop the transmissions of the RLC PDU(s) mapping to the PDCP PDU.

According to a particular embodiment, for example, the second RLC entity 610B may remove the PDCP PDU from the queuing buffer, which may include an RLC SDU, and discard those RLC PDUs (or RLC PDU segments). The second RLC entity may then update the RLC status variables. For example, the second RLC entity 610B may move the transmission window beyond those discarded PDUs when the second RLC entity 610B considers the discarded PDUs as successfully transmitted.

According to certain embodiments relating to AM transmissions, the counter for transmission+retransmissions of the RLC PDU may be reset so that for the particular RLC PDU, the indication of the maximum number of retransmissions reached, cannot be reached.

3) According to certain embodiments, the second RLC entity 610B may inform the peer RLC entity (receiving RLC entity 615B) of which RLC PDU(s) should be discarded. In a particular embodiment, transmission of this indication ("RLC control PDU") may be prioritized over other RLC data to be transmitted.

It may be recognized that the step of the second RLC entity 610B informing the peer RLC entity 615B of which RLC PDU(s) to discard may be difficult since it may be assumed that the link is broken. However, such information allows the receiver to move the reception window beyond the discarded PDUs. According to certain embodiments, the reordering timer does not affect the delivery to PDCP and, thus, does not present a big issue, but may lead to status report transmission.

According to certain embodiments, it may be assumed that the link over this second RLC 610B is eventually again available for transmission, so that the receiver side can indeed be informed of discarded PDUs. When this link is available for transmission again, due to the earlier discard, already received data via the other RLC, does not need to be retransmitted redundantly via the second RLC 610B anymore.

4) The peer RLC entity (receiving RLC entity 615B) of this second RLC 610B discards the RLC PDU(s) indicated in this received indication from the transmitting RLC 610B and updates the RLC status variables and timers accordingly (e.g. reordering timer). The peer RLC entity 610B would consider these RLC PDUs as "successfully received" PDUs, and move the reception window beyond these PDUs.

According to certain embodiments, a PDCP transmission timeout RLF may be provided. Specifically, to avoid the maximum number of RLC retransmissions indication being reached and the triggering of a RLF procedure, an operator may choose to deactivate the indication for both RLCs. To compensate and to still be able to reliably detect RLF, a method on PDCP can be considered. For example, according to certain embodiments, a maximum transmission time limit to acknowledge may be defined for each PDCP PDU. If the maximum transmission time limit is reached, an indication may be triggered to higher layers, which then trigger RLF. In a particular embodiment, when an RLC ACK for the PDCP PDU is received from either RLC 610A-B, the timer may be reset and RLF may not be triggered. Alternatively, a single timer can be defined for the PDCP lower transmit window edge. For example, the PDCP PDU with the lowest SN may not be acknowledged. When this PDCP PDU is not acknowledged for a certain time, the RLF indication is triggered to higher layers.

Figure 9:
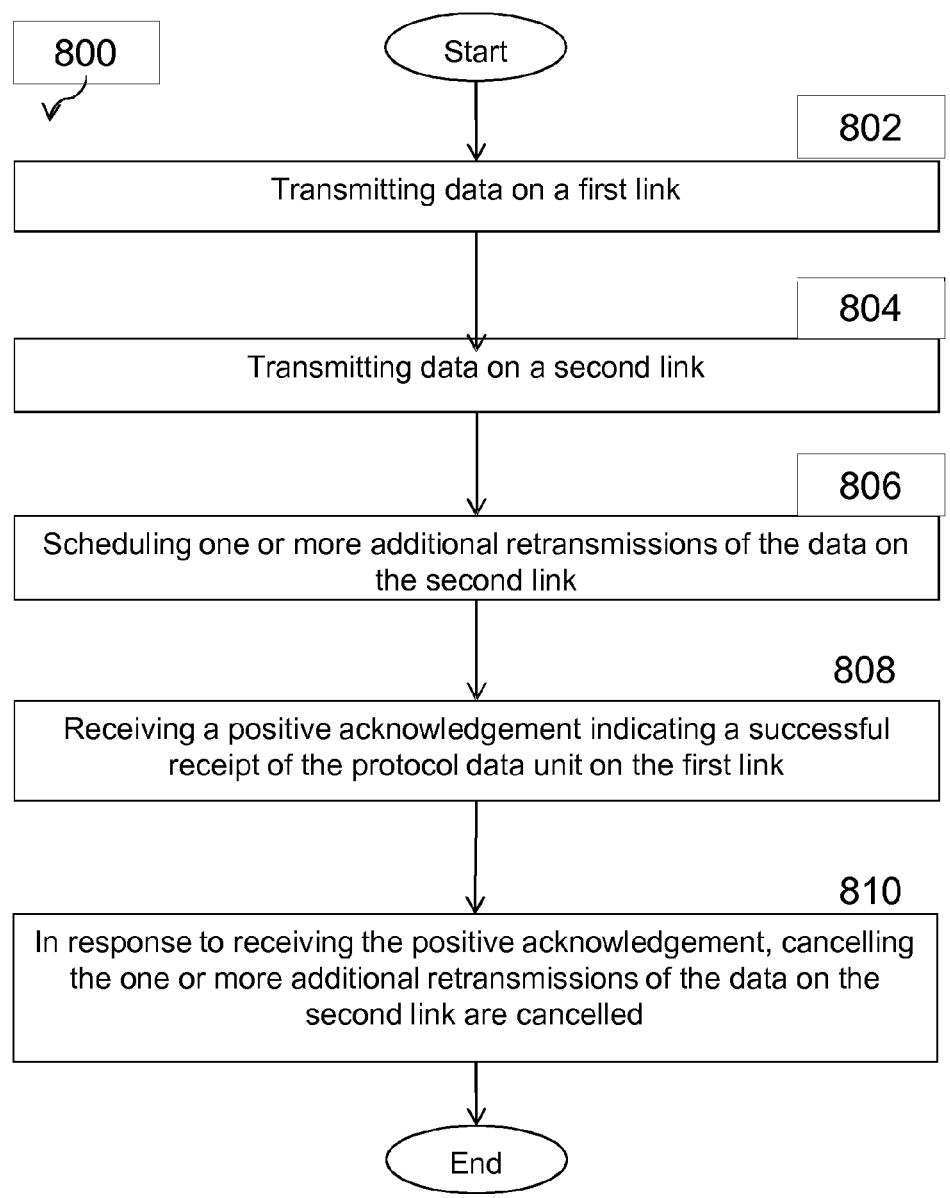
FIG. 9 illustrates an example method by a wireless device for removal of duplicated packets for transmission, according to certain embodiments.

FIG. 9 illustrates an example method 800 by a wireless device for removal of duplicated packets for transmission, according to certain embodiments. In certain embodiments, the method may be performed by a PDCP layer of wireless device 110.

The method may begin at an step 802 when data is transmitted on a first link. In a particular embodiment, the data may include a PDCP PDU. In another embodiment, the data may include a PDCP PDU segment. The data may be further transmitted on a second link, at step 804. Thus, first and second copies of the data may be transmitted on first and second links, respectively, in steps 802 and 804.

In a particular embodiment, the transmission on the first link is performed by a first RLC entity of the wireless device 110 and the transmission on the second link is performed by a second RLC entity of the wireless device 110. In a particular embodiment, the first link and/or first RLC entity may be associated with a first radio access technology and the second link and/or second RLC entity may be associated with a second radio access technology.

At step 806, one or more additional retransmissions of the data are scheduled on the second link. In a particular embodiment, scheduling the at least one additional retransmission of the data may include storing a plurality of copies of the data as PDUs in a RLC SDU buffer.

At step 808, a positive acknowledgement indicating a successful receipt of the protocol data unit on the first link is received from the receiver. In a particular embodiment, the positive acknowledgement is received in an RLC status report. In a particular embodiment, the positive acknowledgement is received via a first RLC entity associated with wireless device 110. The first RLC entity may thereafter transmit an indication to a PDCP entity of wireless device 110 that identifies that the data was successfully received by the receiver. Where the second RLC entity associated with the second link is not co-located with the PDCP, such an indication may be transmitted and received via a backhaul channel, in a particular embodiment. In a particular embodiment, the second RLC entity may transmit an indication to a receiver side RLC entity on the second link. The indication may identify one or more retransmissions of the data to be discarded.

In a particular embodiment, a maximum transmission time threshold may be defined for receiving the positive acknowledgment. The maximum transmission time threshold triggering a radio layer failure procedure. According to certain embodiments, a timer associated with the maximum transmission time threshold may be reset in response to receiving the positive acknowledgment to prevent triggering of the RLF procedure.

At step 810, in response to receiving the positive acknowledgement, the one or more additional retransmissions of the data on the second link are cancelled. In a particular embodiment, where copies of the data are stored for retransmission in the RLC SDU buffer, the copies of the data may be removed from the RLC SDU buffer and discarded.

Figure 10:
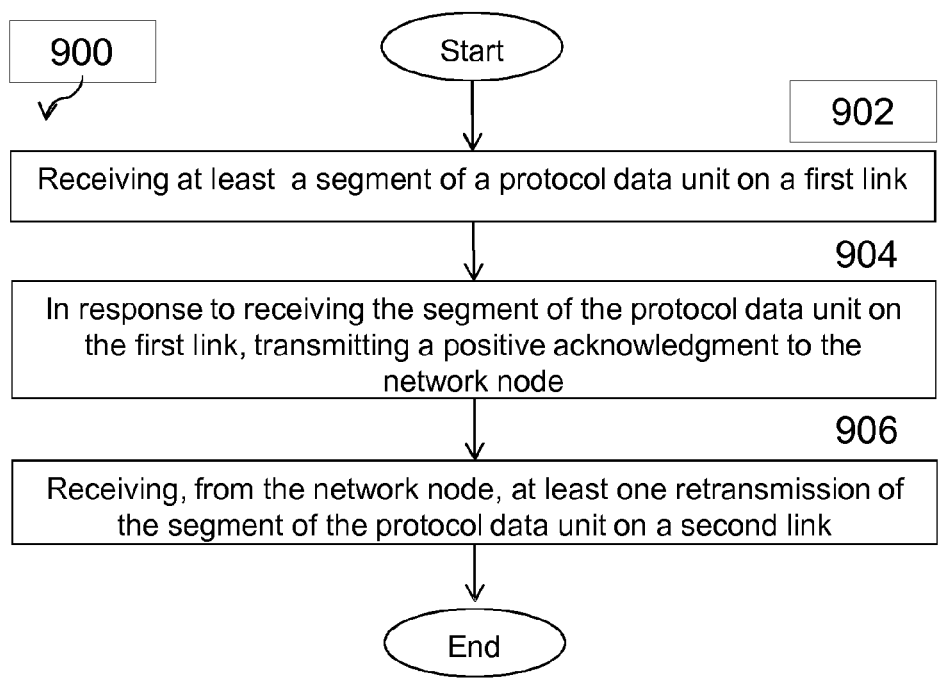
FIG. 10 illustrates an example method by a receiver for removal of duplicated packets for transmission, according to certain embodiments.

FIG. 10 illustrates an example method 900 by a receiver for removal of duplicated packets, according to certain embodiments. In certain embodiments, the method may be performed by a PDCP layer of the receiver. In various particular embodiments, the receiver may include a wireless device, which may include a UE. In another embodiment, the receiver may include a network node.

The method may begin at an step 902 when the receiver receives, from a wireless device 110, a PDU or segment of a PDU on a first link. In a particular embodiment, the PDU or the segment of the PDU may be received by a first RLC entity 615A of the receiver from a first RLC entity 610A of the wireless At step 904, in response to receiving the PDU or the segment of the PDU on the first link, the receiver transmits a positive acknowledgment to the wireless device. In a particular embodiment, the positive acknowledgement may be transmitted in a radio link control, RLC, status report. In a particular embodiment, where the PDU or segment of the PDU is received by a first RLC entity 615A of the receiver, the positive acknowledgment may be transmitted by the first RLC entity 615A of the receiver to a first RLC entity 610A of the wireless device.

At step 906, the receiver receives, from the wireless device, at least one retransmission of the PDU or the segment of the PDU on a second link. In a particular embodiment, the first link may be associated with a first radio access technology and the second link is associated with a second radio access technology. In a particular embodiment, the PDU or the segment of the PDU may be received by a second RLC entity 615B of the receiver from a second RLC entity 610A of the wireless device. In a particular embodiment, the receiver may store the PDU or the segment of the PDU in a RLC SDU buffer.

According to certain embodiments, the receiver may also receive, from the wireless device, a first indication identifying that the at least one retransmission of the PDU or the segment of the PDU received on the second link should be discarded. The receiver may then discard the at least one retransmission of the PDU or the segment of the PDU that was received on the second link. For example, in a particular embodiment, the receiver may remove the PDU or the segment of the PDU from the RLC SDU buffer.

Figure 11:
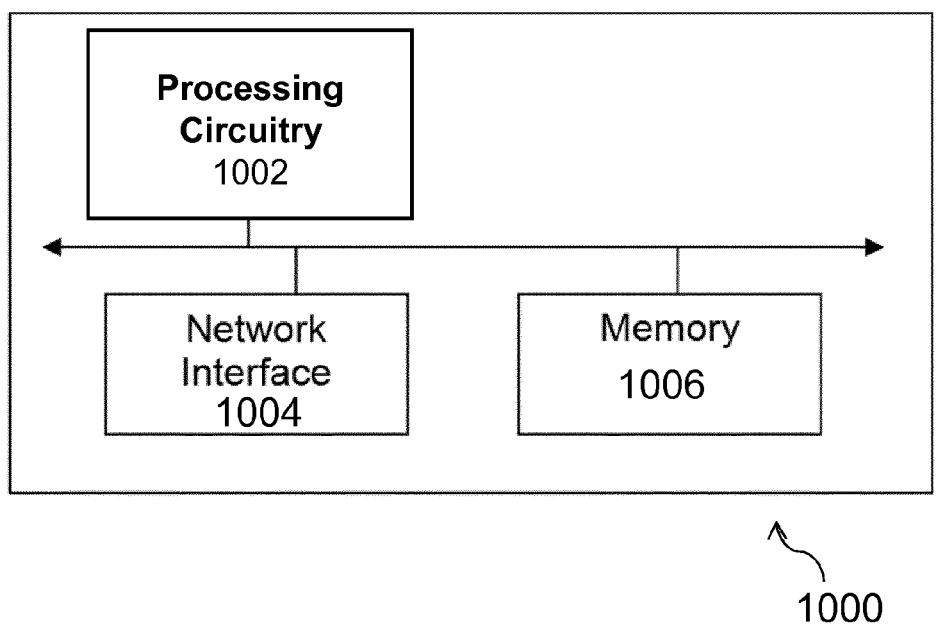
FIG. 11 illustrates an exemplary radio network controller or core network node, according to certain embodiments.

FIG. 11 illustrates an exemplary radio network controller or core network node 1400, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1000 includes processing circuitry 1020, memory 1030, and network interface 1040. In some embodiments, processing circuitry 1020 executes instructions to provide some or all of the functionality described above as being provided by the network node, memory 1030 stores the instructions executed by processing circuitry 1020, and network interface 1040 communicates signals to any suitable node, such as a gateway, switch, router, Internet, Public Switched Telephone Network (PSTN), network nodes 115, radio network controllers or core network nodes 1000, etc.

Processing circuitry 1020 may include any suitable combination of hardware and software implemented in one or more modules to execute instructions and manipulate data to perform some or all of the described functions of the radio network controller or core network node 1000. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

According to certain embodiments, duplication in UL in dual connectivity is provided. Accordingly, several aspects of UL data duplication for Dual Connectivity such as configuration, activation/deactivation, and data duplication operation are discussed.

Data duplication may be more useful for ultra-reliable devices and services. However, UL user plane data duplication might also be an interesting option to cope with situations in which radio links are not stable, e.g. coverage limited situations, while trying to sustain the certain UL bit rate. It could also be an option to help to achieve the 0 ms interruption time requirement.

There are different options to activate/deactivate this feature:
  RRC message: The RRC message configuring the feature could activate/deactivate the feature.
  Event trigger: This mechanism could be similar as a measurement event. Upon a certain event (configured by the network), the UE would activate/deactivate the PDCP data duplication.
  PDCP: PDCP layer could activate and deactivate duplication by means of a PDCP control command. In this case, the NW could send a PDCP control command to the UE when it wants to activate or deactivate duplication. It is to be noted, that the configuration should still be transmitted previously over RRC.
  MAC: MAC already has MAC CE which enables the NW to modify certain MAC features. MAC CE could be used to activate or deactivate PDPC duplication; however, it creates an inter-layer dependency which is not considered beneficial in this case.

Duplication of UL PDCP PDUs will take a considerable amount of resources in the network and, therefore, activation/deactivation should be fully in control of the network. From this angle, the best alternatives to control this feature may be RRC or PDCP. According to certain embodiments:
  PDCP Control Command can activate/deactivate UL (DRB) data duplication.
  Once an PDCP duplication has been activated, the UE should deliver the same PDCP PDUs to both RLC entities.
  Once an PDCP duplication has been deactivated, the UE should not deliver the same PDCP PDUs to both RLC entities.
  Any (duplicated) data in (RLC/MAC) lower layers should be unaffected by the PDCP duplication activation/deactivation.

There may be situations in which, after duplication is activated, data in one of the legs does not go through due to e.g. bad radio conditions. The other leg, however, may perform adequately. That results in that data is received in the NW through one of the legs.

In the leg which had bad radio, the RLC will be performing retransmissions which might not be longer needed (as it has been received through the other leg). If the leg recovers, the RLC may still transmit the data pending in the RLC/MAC (i.e. the retransmissions). All this data, however, will be discarded by the NW. Thus, it is preferable if the UE does not transmit it.

In the worst cases, if this leg does not recover, the maximum number of RLC retransmissions could be reached, and this would trigger an RLF failure, which might not be needed in this case.

This opens up the question on whether a mechanism should be introduced to avoid wasting resources and avoid RLFs for duplicated data which has been received in one leg but may be under retransmissions in the second leg.

The PDCP layer at the UE can know if a PDCP PDU was received by the NW if RLC AM was used. The PDCP layer also knows in which leg the data was successfully received. Thus, The PDCP entity could indicate to the other RLC entity to stop the transmission of those PDCP PDUs. The peer RLC entity (at the NW side) would also need to be informed of this, so that the receiver window can be moved forward.

According to certain embodiments, a method in a wireless device may include:
  transmitting data on a first link;
  transmitting the data on a second link;
  scheduling one or more additional retransmissions of the data on the second link;
  receiving, from a receiver, a positive acknowledgement indicating a successful receipt of the protocol data unit on the first link; and
  in response to receiving the positive acknowledgement, cancelling the one or more additional retransmissions of the data on the second link;
  optionally, the data comprises a packet data unit;
  optionally, the data comprises a segment of a packet data unit;
  optionally, the positive acknowledgement is received in an RLC status report;
  optionally, the positive acknowledgement is received via a first RLC entity associated with the first link, and wherein the first RLC entity transmits an indication to a PDCP entity of the wireless device that the data was received by the receiver,
  optionally, a second RLC entity associated with the second link is not co-located with the PDCP and the indication transmitted to the PDCP entity is received via a backhaul channel;
  optionally, the second RLC entity transmits an indication to the a receiver side RLC entity associated with the second link, the indication identifying one or more retransmissions of the data to be discarded;
  optionally, scheduling the at least one additional retransmission of the data comprises storing a plurality of copies of the data as PDUs in a RLC SDU buffer;
  optionally, cancelling the one or more additional retransmissions of the data on the second link comprises removing the plurality of copies of the data from the RLC SDU buffer and discarding the removed copies of the data;

optionally, the positive acknowledgement received via the first RLC entity associated with the first link is received before a positive acknowledgement is received via a second RLC entity associated with the second link;

optionally, the first link is associated with a first radio access technology and the second link is associated with a second radio access technology;

optionally, the method is performed by a PDCP layer of the wireless device;

optionally, the transmission on the first link is performed by a first RLC entity of the wireless device;

optionally, the transmission on the second link is performed by a second RLC entity of the wireless device;

optionally, receiving a configuration from a network node for RLC acknowledgement mode (AM);

optionally, a maximum transmission time threshold is defined for receiving the positive acknowledgment, the maximum transmission time threshold triggering a radio layer failure procedure;

optionally, in response to receiving the positive acknowledgment, resetting a timer associated with the maximum transmission time threshold to prevent triggering of the RLF procedure.

According to certain embodiments, a wireless device may include:

processing circuitry, the processing circuitry configured to:
transmit data on a first link;
transmit the data on a second link;
schedule one or more additional retransmissions of the data on the second link;
receive, from a receiver, a positive acknowledgement indicating a successful receipt of the protocol data unit on the first link; and
in response to receiving the positive acknowledgement, cancel the one or more additional retransmissions of the data on the second link;

optionally, the data comprises a packet data unit;

optionally, the data comprises a segment of a packet data unit;

optionally, the positive acknowledgement is received in an RLC status report;

optionally, the positive acknowledgement is received via a first RLC entity associated with the first link, and wherein the first RLC entity transmits an indication to a PDCP entity of the wireless device that the data was received by the receiver;

optionally, a second RLC entity associated with the second link is not co-located with the PDCP and the indication transmitted to the PDCP entity is received via a backhaul channel;

optionally, the second RLC entity transmits an indication to the a receiver side RLC entity associated with the second link, the indication identifying one or more retransmissions of the data to be discarded;

optionally, scheduling the at least one additional retransmission of the data comprises storing a plurality of copies of the data as PDUs in a RLC SDU buffer;

optionally, cancelling the one or more additional retransmissions of the data on the second link comprises removing the plurality of copies of the data from the RLC SDU buffer and discarding the removed copies of the data;

optionally, the positive acknowledgement received via the first RLC entity associated with the first link is received before a positive acknowledgement is received via a second RLC entity associated with the second link;

optionally, the first link is associated with a first radio access technology and the second link is associated with a second radio access technology, optionally, the processing circuitry is associated with a PDCP layer of the wireless device;

optionally, transmission on the first link is performed by a first RLC entity of the wireless device;

optionally, transmission on the second link is performed by a second RLC entity of the wireless device;

optionally, the processing circuitry is further configured to receive a configuration from a network node for RLC acknowledgement mode (AM);

optionally, a maximum transmission time threshold is defined for receiving the positive acknowledgment, the maximum transmission time threshold triggering a radio layer failure procedure;

optionally, in response to receiving the positive acknowledgment, the processing circuitry is further configured to reset a timer associated with the maximum transmission time threshold to prevent triggering of the RLF procedure.

Certain embodiments of the present disclosure may provide one or more technical advantages. For example, certain embodiments may avoid the unnecessary triggering of a Radio Link Failure (RLF) procedure in response to a maximum number of RLC transmissions when data is duplicated and transmitted via two different links and a successful transmission is received via one of the two links. Accordingly, certain embodiments save network resources. Additionally, certain embodiments avoid RLC reestablishments.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a network node comprises:
transmitting, by a first radio link control (RLC) entity, a Packet Data Convergence Protocol (PDCP) protocol data unit (PDU) or segment of a PDCP PDU on a first link;

transmitting, by a second RLC entity, the PDCP PDU or the segment of the PDCP PDU on a second link, wherein the second RLC entity is associated with the second link;

scheduling, by the second RLC entity, one or more retransmissions of the PDCP PDU or the segment of the PDCP PDU on the second link;

receiving, from a receiver and via the first RLC entity, a positive acknowledgement indicating a successful receipt of the PDCP PDU or the segment of the PDCP PDU on the first link;

transmitting, by the first RLC entity an indication to a PDCP entity that the PDCP PDU or segment of the PDCP PDU was received by the receiver;

communicating, via a backhaul channel, an indication to the second RLC entity to discard the PDCP PDU or segment of the PDCP PDU; and in response to receiving the indication to discard the PDCP PDU or segment of the PDCP PDU, cancelling the one or more retransmissions of the PDCP PDU or the segment of the PDCP PDU on the second link.

2. The method of claim 1, wherein the positive acknowledgement is received in RLC status report.

3. The method of claim 1, wherein the positive acknowledgment received via the first RLC entity associated with the first link is received before a positive acknowledgment is received via the second RLC entity associated with the second link.

4. The method of claim 1, wherein the second RLC entity transmits an indication to a receiver side RLC entity associated with the second link, the indication identifying one or more retransmissions of the data to be discarded.

5. The method of claim 1, wherein scheduling the at least one retransmission of the PDCP PDU or the segment of the PDCP PDU comprises storing a plurality of copies of the PDCP PDU or the segment of the PDCP PDU in a RLC service data unit, SDU, buffer.

6. The method of claim 5, wherein cancelling the one or more retransmissions of the PDCP PDU or the segment of the PDCP PDU on the second link comprises removing the plurality of copies of the PDCP PDU or the segment of the PDCP PDU from the RLC SDU buffer and discarding the removed plurality of copies of the PDCP PDU or the segment of the PDCP PDU.

7. The method of claim 1, wherein the first link is associated with a first radio access technology and the second link is associated with a second radio access technology.

8. The method of claim 1, wherein a maximum transmission time threshold is defined for receiving the positive acknowledgment, the maximum transmission time threshold triggering a radio layer failure, RLF, procedure.

9. The method of claim 1, further comprising, in response to receiving the positive acknowledgment, resetting a timer associated with the maximum transmission time threshold to prevent triggering of the RLF procedure.

10. A network node comprises:
processing circuitry configured to:
transmit, by a first Radio Link Control (RLC) entity, a Packet Data Convergence Protocol (PDCP) protocol data unit (PDU) or a segment of a PDCP PDU on a first link, wherein the first RLC entity is associated with the first link;

transmit, by a second RLC entity, the PDCP PDU or the segment of the PDCP PDU on a second link, wherein the second RLC entity is associated with the second link;

schedule one or more retransmissions of the PDCP PDU or the segment of the PDCP PDU on the second link;

receive, from a receiver and via the first RLC entity, a positive acknowledgement indicating a successful receipt of the PDCP PDU or the segment of the PDCP PDU on the first link;

transmit, by the first RLC entity an indication to a PDCP entity that the PDCP PDU or segment of the PDCP PDU was received by the receiver;

communicate, via a backhaul channel, an indication to the second RLC entity to discard the PDCP PDU or segment of the PDCP PDU; and in response to receiving the indication to discard the PDCP PDU or segment of the PDCP PDU, cancel the one or more retransmissions of the PDCP PDU or the segment of the PDCP PDU on the second link.

11. The network node of claim 10, wherein the positive acknowledgement is received in a RLC status report.

12. The network node of claim 10, wherein the positive acknowledgment received via the first RLC entity associated with the first link is received before a positive acknowledgment is received via a second RLC entity associated with the second link.

13. The network node of claim 10, wherein the second RLC entity transmits an indication to a receiver side RLC entity associated with the second link, the indication identifying one or more retransmissions of the data to be discarded.

14. The network node of claim 10, wherein scheduling the at least one retransmission of the PDCP PDU or the segment of the PDCP PDU comprises storing a plurality of copies of the PDCP PDU or the segment of the PDCP PDU in a RLC service data unit, SDU, buffer.

15. The network node of claim 10, wherein cancelling the one or more retransmissions of the PDCP PDU or the segment of the PDCP PDU on the second link comprises removing the plurality of copies of the PDCP PDU or the segment of the PDCP PDU from the RLC SDU buffer and discarding the removed plurality of copies of the PDCP PDU or the segment of the PDCP PDU.

16. The network node of claim 10, wherein the first link is associated with a first radio access technology and the second link is associated with a second radio access technology.

17. The network node of claim 10, wherein the processing circuitry is associated with a PDCP layer of the network node.

18. The network node of claim 10, wherein a maximum transmission time threshold is defined for receiving the positive acknowledgment, the maximum transmission time threshold triggering a radio layer failure, RLF, procedure.

* * * * *

UNITED STATES PATENT AND TRADEMARK OFFICE
CERTIFICATE OF CORRECTION

PATENT NO. : 11,552,745 B2  
APPLICATION NO. : 17/314802  
DATED : January 10, 2023  
INVENTOR(S) : Pradas et al.

Page 1 of 3

It is certified that error appears in the above-identified patent and that said Letters Patent is hereby corrected as shown below:

On the Title Page

Item (63), under "Related U.S. Application Data", in Column 1, Line 2, delete "PCT/PP2017/082577" and insert -- PCT/EP2017/082577 --, therefor.

Item (63), under "Related U.S. Application Data", in Column 1, Line 3, delete "Pat. No. 1,105,606." and insert -- Pat. No. 11,005,606. --, therefor.

In the Drawings

In Figure 2, Sheet 2 of 11, delete " 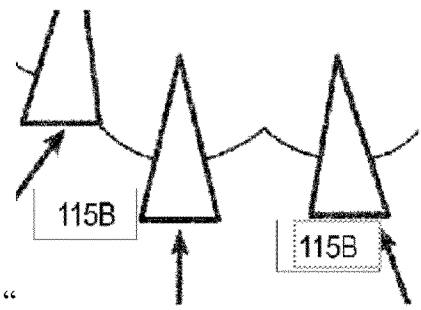 " and insert

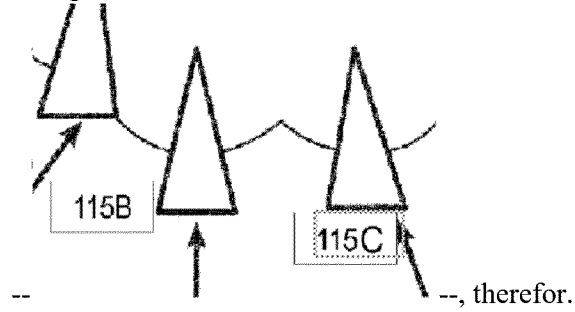 --, therefor.

In Figure 11, Sheet 11 of 11, delete Tag "1002" and insert Tag -- 1020 --, therefor.

Signed and Sealed this  
Eleventh Day of July, 2023

*Katherine Kelly Vidal*

Katherine Kelly Vidal  
*Director of the United States Patent and Trademark Office*

CERTIFICATE OF CORRECTION (continued)
U.S. Pat. No. 11,552,745 B2

In Figure 11, Sheet 11 of 11, delete Tag "1004" and insert Tag -- 1040 --, therefor.

In Figure 11, Sheet 11 of 11, delete Tag "1006" and insert Tag -- 1030 --, therefor.

In the Specification

In Column 1, Line 9, delete "2018" and insert -- 2018, now Pat. No. 11,005,606, --, therefor.

In Column 2, Line 61, delete "illustrate" and insert -- illustrates --, therefor.

In Column 2, Line 64, delete "example" and insert -- an example --, therefor.

In Column 4, Line 12, delete "intermode" and insert -- internode --, therefor.

In Column 4, Line 30, delete "(NB-IoT)" and insert -- (NB-IoTs) --, therefor.

In Column 5, Line 58, delete "and/or or" and insert -- and/or --, therefor.

In Column 6, Line 1, delete "illustrate" and insert -- illustrates --, therefor.

In Column 6, Lines 4-7, delete "As described above, network node 115 may be any type of radio network node or any network node that communicates with a wireless device and/or with another network node. Examples of a network node 115 are provided above." and insert the same at Line 3 after "embodiments." as a continuation paragraph.

In Column 6, Line 60, delete "and/or or" and insert -- and/or --, therefor.

In Column 7, Lines 32-40, delete "FIG. 6 illustrates a PDCP PDU 500 transmitted independently by two RLC entities, according to certain embodiments. Typically, the receiving entity may transmit a positive acknowledgment within a RLC status report for each RLC PDU that is successfully received. When all RLC PDUs (or PDU segments) carrying the different parts of the PDCP PDU have been acknowledged, the RLC entity will indicate to the PDCP entity that the PDCP packet was received by the peer entity." and insert the same at Line 33, as a new paragraph.

In Column 7, Line 62, delete "may 610B" and insert -- entity 610B may --, therefor.

In Column 8, Line 37, delete "610B" and insert -- entity 610B --, therefor.

In Column 8, Line 43, delete "610B" and insert -- entity 610B --, therefor.

In Column 8, Line 45, delete "610B" and insert -- entity 610B --, therefor.

In Column 8, Line 46, delete "610B" and insert -- entity 610B --, therefor.

In Column 8, Line 64, delete "RLC" and insert -- RLC entity --, therefor.

CERTIFICATE OF CORRECTION (continued)
U.S. Pat. No. 11,552,745 B2

In Column 9, Line 9, delete "an step" and insert -- step --, therefor.

In Column 9, Line 49, delete "layer" and insert -- link --, therefor.

In Column 10, Line 1, delete "an step" and insert -- step --, therefor.

In Column 10, Line 6, delete "wireless" and insert -- wireless device. --, therefor.

In Column 11, Line 4, delete "and/or or" and insert -- and/or --, therefor.

In Column 12, Line 54, delete "receiver," and insert -- receiver; --, therefor.

In Column 12, Line 60, delete "the a" and insert -- the --, therefor.

In Column 13, Line 23, delete "layer" and insert -- link --, therefor.

In Column 13, Line 57, delete "the a" and insert -- the --, therefor.

In Column 14, Line 7, delete "technology," and insert -- technology; --, therefor.

In Column 14, Line 21, delete "layer" and insert -- link --, therefor.

In Column 14, Lines 43-47, delete "Additionally, operations of the systems and apparatuses may be performed using any suitable logic comprising software, hardware, and/or other logic. As used in this document, "each" refers to each member of a set or each member of a subset of a set." and insert the same at Line 42 after "components." as a continuation paragraph.

In the Claims

In Column 15, Line 52, in Claim 8, delete "layer" and insert -- link --, therefor.

In Column 16, Line 59, in Claim 18, delete "layer" and insert -- link --, therefor.